United States Patent [19]
Hailpern et al.

[11] Patent Number: 4,740,956
[45] Date of Patent: Apr. 26, 1988

[54] LINEAR-SPACE SIGNALLING FOR A CIRCUIT-SWITCHED NETWORK

[75] Inventors: Brent T. Hailpern, Katonah; Lee W. Hoevel, Yorktown Heights; Yannick J. Thefaine, Beacon, all of N.Y.

[73] Assignee: IBM Corporation, Armonk, N.Y.

[21] Appl. No.: 814,848

[22] Filed: Dec. 30, 1985

[51] Int. Cl.$^4$ ............................. H04J 3/02; H04J 3/12
[52] U.S. Cl. ................................. 370/85; 370/110.1; 340/825.1
[58] Field of Search ..................... 370/85, 58, 86, 92, 370/110.1; 340/825.5

[56] References Cited

U.S. PATENT DOCUMENTS

| | | | |
|---|---|---|---|
| 3,395,394 | 10/1965 | Cottrell, Jr. | 340/825.5 |
| 3,517,130 | 6/1970 | Rynders | 370/85 |
| 4,096,572 | 6/1978 | Namimoto | 364/200 |
| 4,340,775 | 7/1982 | Gesek et al. | 370/85 |
| 4,488,218 | 12/1984 | Grimes | 340/825.5 |
| 4,488,290 | 12/1984 | Dunn et al. | 370/85 |
| 4,564,938 | 1/1986 | Boot | 370/85 |
| 4,565,627 | 4/1987 | Hasley et al. | 370/85 |
| 4,595,923 | 6/1986 | McFarland, Jr. | 370/85 |
| 4,613,861 | 9/1986 | Ault | 370/85 |
| 4,623,886 | 11/1986 | Livingston | 370/85 |
| 4,631,534 | 12/1986 | Franklin et al. | 370/85 |

OTHER PUBLICATIONS

"Join Micros into Intelligent Networks", Raphael, *Electronic Design*, 3/75.

*Primary Examiner*—Douglas W. Olms
*Assistant Examiner*—Curtis Kuntz
*Attorney, Agent, or Firm*—Pollock, Vande Sande & Priddy

[57] ABSTRACT

A circuit-switched local area network relies on a star topology for data transfer. Signalling information is confined to a single common signalling link or channel. Contention on the signalling link or channel is obviated by the use of a contention resolution device which is coupled to all ports for receiving requests to send from the ports and for providing clear to send messages to the requesting ports, in turn. A port desiring communication with another port first raises its request to send and when it receives a clear to send from the contention resolution device, it places the message or call set up information on the signalling link or channel. Once the call or message set up information has been transmitted, the addressing port may de-assert its request to send which will result in the contention resolution device de-asserting the clear to send.

7 Claims, 5 Drawing Sheets

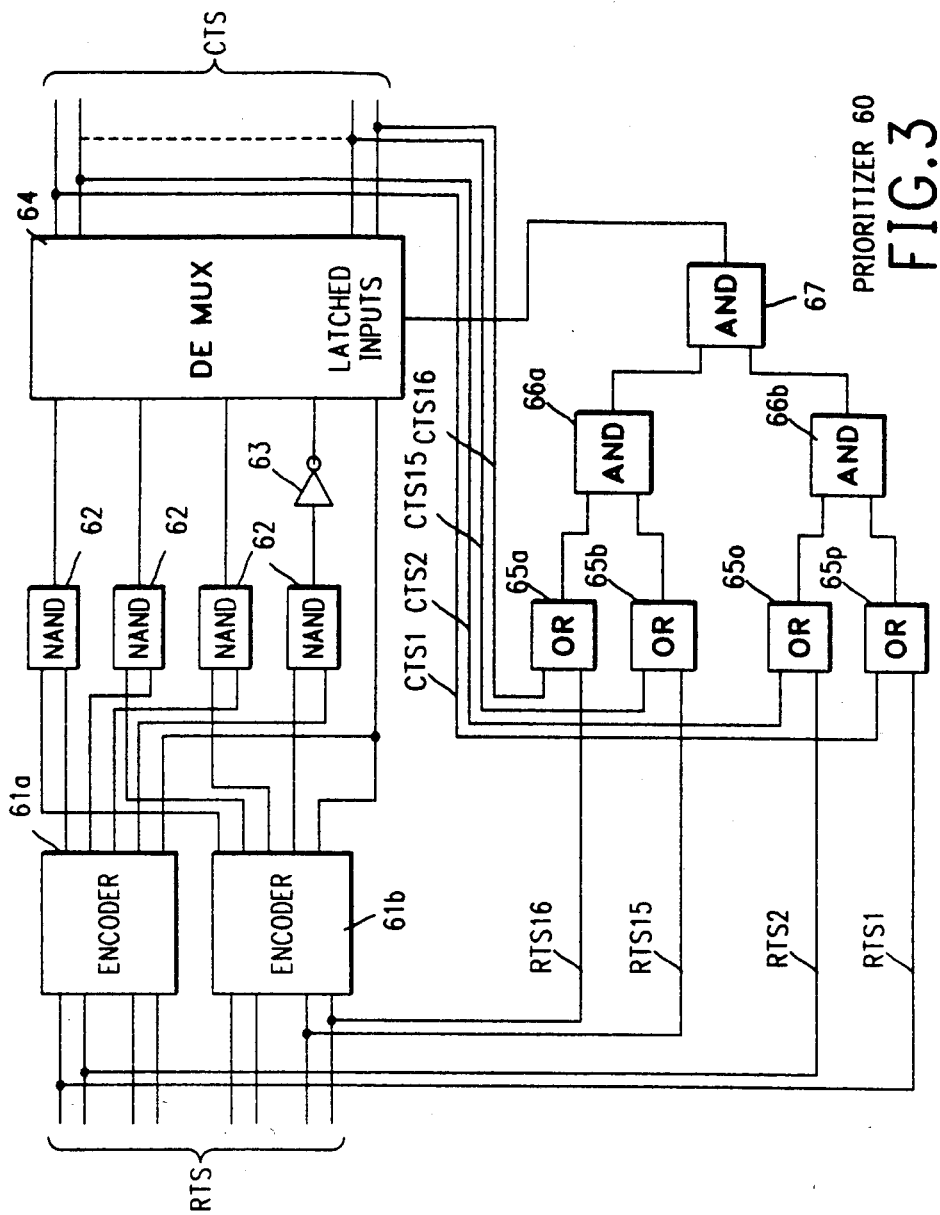

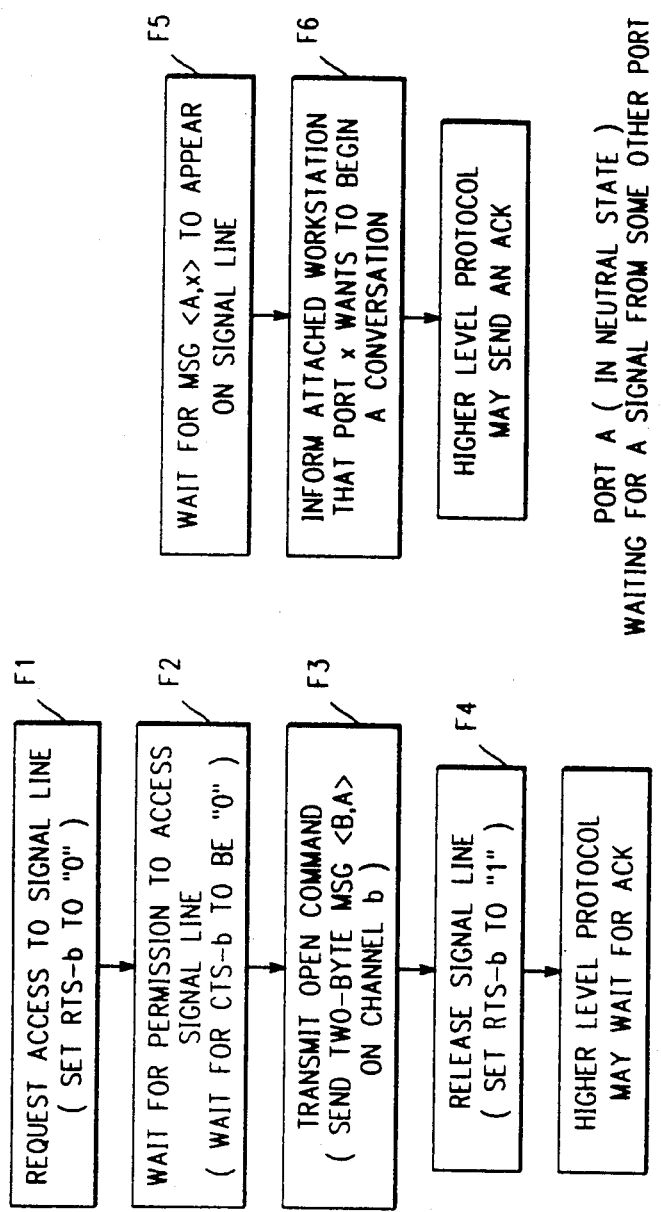

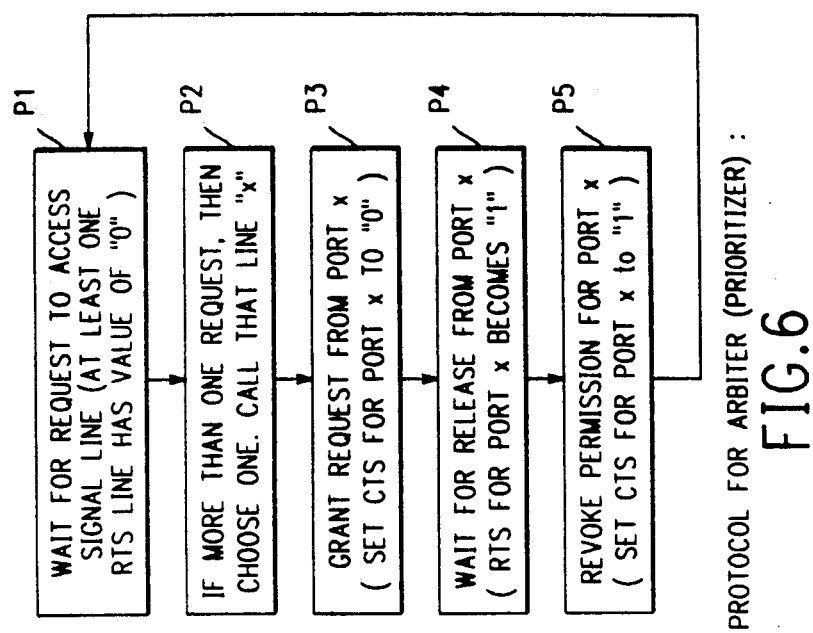

LINEAR-SPACE SIGNALLING FOR A CIRCUIT-SWITCHED NETWORK

DESCRIPTION

1. Technical Field

The present invention relates to communications, and more specifically, local area networks, wherein the improvement comprises an efficient signalling arrangement for a circuit-switched or star topology systems.

2. Background Art

The typical communications system involves at least an interface or port through which a communicating device (sometimes referred to as an information source/sink) can be connected to the network and an arrangement for interconnecting the various ports so as to allow information (data) originating at one information source/sink to be directed over the network to be received at a different information source/sink.

One criteria for distinguishing among communications systems is the manner in which the communication media itself is employed; the present invention relates to so-called circuit-switched networks, and more particularly circuit-switched networks which employ the topology of a star network. Star networks provide a dedicated communication link or channel between different interfaces or ports. A prime advantage of such circuit-switched networks is the elimination of most contention problems. More particularly, when port A has a dedicated communication link to be used in communicating with port B, then by definition that communication link will always be available, that is there is no other port which can use that particular communication link for any purpose.

The circuit-switched star topology does not eliminate all contention problems. The outstanding problem still remaining is that of determining whether or not the port to which communications are to be directed is free or if it is, on the other hand, presently engaged in communication with some other port. Identifying the status of the remote port requires essentially additional communications, that is, the port desiring to transmit to the remote port must communicate this desire to the remote port, so as to stimulate, in return, information identifying the status of the remote port. This type of communication is sometimes referred to as signalling and the information exchanged during signalling is referred to as call set up information.

Signalling can be accomplished either in band or out of band; the distinction depends on whether or not the signalling will occupy the same communications facilities as will the information (data) which will be ultimately transmitted between the ports (in band) or whether that signalling information will occupy different communications facilities (out of band). The present invention is directed to a system which employs out of band signalling. We shall henceforth use the term "data" to refer to the information to be exchanged by the work stations and the term "signal" to refer to call set up messages, or other preparatory messages.

Providing for out of band signalling requires the expenditure of additional communication resources. The quantum and arrangement of the resources applied to out of band signalling will affect the characteristics of the out of band signalling, e.g. how quickly can the interrogation or request message be transmitted and how quickly can the reply or acknowledgement be transmitted? Of course, these are countervailing considerations and the ultimate goal is to expend as little communication resources as is necessary to achieve a system with as little delay as is reasonable.

SUMMARY OF THE INVENTION

In accordance with the invention, a signalling arrangement is applied to handle signalling in connection with a circuit-switched communication system. In accordance with the invention a common communication link is used to carry signalling information along all the ports; this clearly minimizes the communication resources expended on signalling. However, by sharing this single communication link among all the ports, we must handle the contention which may arise by reason of this shared use. We eliminate contention and provide for orderly scheduling the use of the single signalling link by the use of a prioritizer or contention-resolution device. The contention-resolution device is coupled to each port over a bi-directional communication link (or a pair of uni-directional links). The protocol we employ requires that each port desiring to engage in communication first manifest that desire by signalling the contention-resolution device (that is, transmitting a request to send or asserting its request to send). Since the contention-resolution device has visibility of all ports, it clearly has visibility of all requests to send. The contention-resolution device selects (on a rational base) a single one (if there is more than a single request to send) and authorizes that port to use the signalling link by returning a clear to send or asserting that port's clear to send. By this technique, then, the port receiving the clear to send has had exclusively allocated to it the use of the signalling link. As soon as the port employing the signalling link is through, it withdraws (de-asserts) its request to send so that the contention-resolution device can authorize a further port (if any) to exclusively employ the signalling link.

At any port, after asserting its request to send, it waits for receipt of a clear to send from the contention-resolution device. On receipt of the clear to send, the port then transmits on the signalling link and that transmission will at least identify the port with which communication is desired. Preferably the signalling information will also identify the transmitting port. As soon as the transmitting port has completed use of the signalling link, it withdraws or de-asserts its request to send.

Thus the invention provides a communication system comprising:

a plurality of ports, each port coupled to an information source/sink for the transmission or reception of information, a plurality of communication links equal in number to the number of ports such that each port has a dedicated link onto which it can transmit, and signalling means comprising:

a signalling link coupled to all said ports for transferring call or message set up information, priority establishing means coupled to each port via a different bi-directional link for allocating exclusive use of said signalling link in message or call set up, and control means at each port for transmitting call or message set up information on said signalling link in response to receipt of exclusive allocation of said signalling link from said priority establishing means.

In accordance with the invention, the communication links are arranged in the form of a back plane, such that for n ports there are n wires. An additional common wire or signalling link is coupled to each of the ports. In the event the signalling phase is successfully concluded, e.g. a port desiring to communicate with a remote port receives the exclusive use of the signalling link, transmits the address of both the remote port and its own address, that message is received by the remote port, which, if then free, will acknowledge the message, then each of the ports will connect their associated information source/sink to an appropriate one of the communication links, to thereby enable information transfer to proceed. Thus the invention provides a star-topology circuit-switched local area network having n work stations, each with a respective port for controlling the transmission and reception of data thereby, the combination comprising:

back plane means comprising n wires for transmitting data between said ports, common wire means connected to each of said ports for providing a single signalling path between any of said ports and all of the other of said ports for the transfer of signals, contention resolution means connected to each of said ports for controlling the transmission of addressing signals over the common wire means between said ports, which addressing signals from an addressing port to an addressed port determine whether the addressed port is engaged, and means for connecting an addressing port and an addressed port to one of said n wires for the transmission of data signals therebetween.

BRIEF DESCRIPTION OF THE DRAWINGS

The present invention will now be described in such further detail as to enable those skilled in the art to make and use the same in the following portions of this specification when taken in conjunction with the attached drawings in which like reference characters identify identical apparatus and in which:

FIG. 3 is a block diagram of one suitable prioritizer 60 as represented in FIG. 1;

FIG. 4 shows the protocol used to open a connection from a typical port;

FIG. 5 shows the protocol at an addressed (free) port in accordance with the protocol; and FIG. 6 shows the protocol implemented by a prioritizer in accordance with the invention.

DESCRIPTION OF A PREFERRED EMBODIMENT

Figure 1:
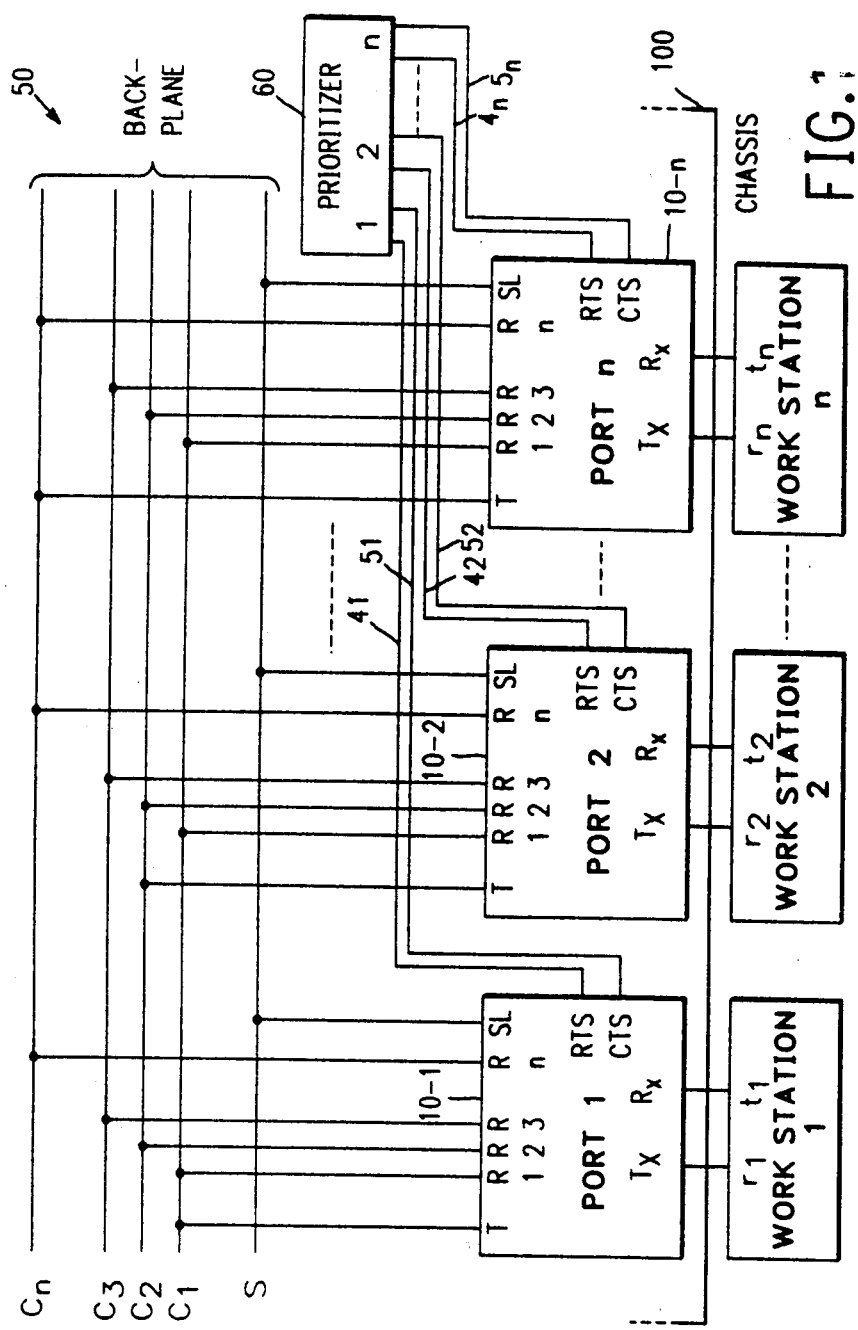
FIG. 1 is a block diagram of a circuit-switched local area network in accordance with the invention.

As will be described below, a communication system is described which is non-blocking for data and in which only open messages are serialized and may be queued in parallel. A block diagram illustrating a preferred embodiment of the invention is shown in FIG. 1. As seen in FIG. 1, three work stations, work station 1, work station 2 and work station n, are connected to the communications system which is contained within the CHASSIS 100. Clearly, the three work stations of FIG. 1 are exemplary and many more work stations may be served in analogous fashion.

The communications system contained within the CHASSIS 100 can be broken down into a plurality of ports 10, each associated with a different work station, and common apparatus including a back plane 50 and a prioritizer 60.

The back plane 50 includes a plurality of communication links, each communication link in the embodiment being described a separate conductor or wire such as C1, C2, Cn. The back plane 50 includes a different communication link or wire for each different port, thus port 10-1 is associated with conductor C1, port 10-2 is associated with conductor C2 and port 10-n is associated with conductor Cn. Each of the ports includes a plurality of terminals, one transmit terminal T and a plurality of receive terminals, each of the receive terminals is coupled to a different one of the conductors C1 through Cn, and the transmit terminal T is coupled to that one of the conductors which is dedicated to the port. Communications can be established for example between work station 1 and work station 2 by inducing port 10-2 to respond to its receive terminal R1, because communications originating at the work station 1 pass through the port 10-1, out to transmit terminal T and are placed on the conductor C1; the reader will note that conductor C1 is coupled to the R1 terminal of port 10-2 (it is also coupled to the R1 terminal of each other port). For bi-directional communications, the work station 1 can receive information from the work station 2 if work station 1 can be induced to respond to signals at its terminal R2, since that terminal is coupled to conductor C2 to which is also coupled the transmit terminal T of port 10-2.

For the purpose of inducing the ports to respond to a specified one of their terminals, call or message set up or signalling is required. That function is accomplished by the common signalling communication link S; note that each of the ports has a terminal SL coupled to this common link S.

Thus when work station 1 desires to communicate with work station 2 (through port 10-2), it is necessary for port 10-1 to place a message on the signalling link S indicating this desire, and specifically address the port 10-2. Because each of the other ports in the communication network will look to the common signalling link S on which to transfer signalling or call set up information, contention on this link is possible.

To avoid this contention, the prioritizer 60 is provided. Prioritizer 60 is coupled over a different bi-directional link (shown in FIG. 1 as two unidirectional links) to terminals RTS and CTS of each of the ports. More particularly, port 10-1 can transmit to the prioritizer 60 over the link 41, and it can receive from the prioritizer 60 over the link 51. Similarly, ports 10-2 and 10-n are coupled to the prioritizer 60 via conductors 42, 52 and 4n, 5n, respectively.

In brief compass, a protocol is established whereby before any port can employ the common signalling line S, it must receive a clear to send message from the prioritizer 60 (over one of the conductors 51, 52-5n). On the other hand, the prioritizer 60 responds to a request to send message (coupled on one of the conductors 41, 42-4n). Accordingly the prioritizer 60 has visibility of requests to send from each of the ports in the network. Thus the prioritizer 60 can provide exclusive use of the signalling line S to one of the ports at a time, and only after the port has indicated it is no longer in need of the signal line S will the prioritizer 60 provide a clear to send message to any other port. It should be apparent, therefore, that while the prioritizing arrangement eliminates the possibility of collisions on the signalling line S, it does admit the possibility of delay.

Figure 2:
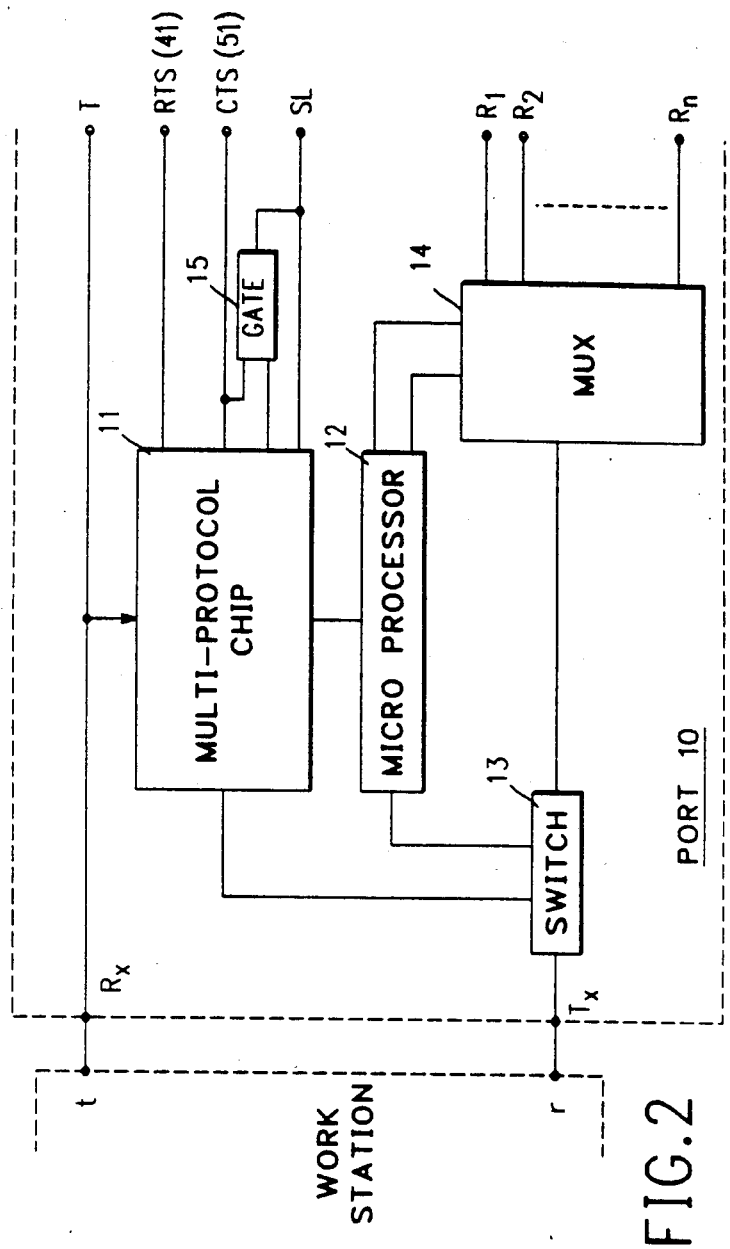
FIG. 2 is a block diagram of a typical port 10 as shown in FIG. 1.

FIG. 2 is a detailed block diagram of a typical port 10 showing its interconnection between the typical work station and the back plane. More particularly, the port 10 includes Rx and Tx terminals which are connected respectively to the transmit t and receive r terminals of the work station. The port also includes a plurality of receive terminals (R1-Rn), a transmit terminal T, a connection SL to the common signalling conductor S, as well as RTS and CTS terminals. As shown in FIG. 2, the port's Rx terminal is connected directly to its T terminal, and via that terminal to the dedicated communication link (or conductor) associated or corresponding to the port in the back plane 50. The same conductor is coupled to the multi-protocol chip 11. The multi-protocol chip 11 is also coupled to a switch 13 interposed between the port's Tx terminal and the output of a multiplexer 14. The inputs to the multiplexer are provided by the port's receive terminals R1-Rn. The multiplexer 14, the switch 13 and the multi-protocol chip 11 are also connected to a microprocessor 12. The multi-protocol chip includes an output coupled to the RTS terminal, an input from the CTS terminal and the connection to the SL terminal. Associated with the multi-protocol chip is a tri-state gate 15. The multi-protocol chip 11 is designed to receive from the terminal SL, but it can also transmit onto the terminal SL via the tri-state gate 15, when the CTS input is asserted to partially enable the tri-state gate 15. In one embodiment of the invention, the multi-protocol chip 11 corresponds to Intel's 8274.

The prioritizer 60 performs a relatively simple function. More particularly, it is coupled to RTS terminals from a plurality of ports and thus can determine which of the ports is requesting access to the signalling line S by noting the status of the associated RTS line. The prioritizer 60 then on a rational basis enables one and only one of the CTS lines to a particular port. This line remains enabled until that port's RTS line is de-asserted. At that time, the prioritizer 60 de-asserts the corresponding CTS line and can thereafter assert a different CTS line if in fact another port is presently asserting a RTS line.

FIG. 3 is a detailed block diagram of one suitable prioritizer 60. As shown in FIG. 3, the RTS lines are input to a plurality of priority encoders 61a, 61b such as 74LS148. The priority encoders provide outputs to NAND gates 62 such as 74LS00. The outputs of each of the NAND gates 62, save one, is coupled directly to the input of a demultiplexer 64 such as Signetics HEF 4515B. The specified output of the NAND gate 62 is coupled to the demultiplexer 64 through an inverter 63. The outputs of the demultiplexer 64 are the CTS lines.

Corresponding RTS and CTS lines are also input to OR gates 65, with an OR gate dedicated to each port. Outputs of the OR gates are input to an AND network made of gates 66a, 66b and 67. When an RTS line that had been asserted changes to de-asserted, the latch input to demux 64 is asserted so that the state of the CTS lines is also altered to reflect the altered inputs to the demux 64.

In operation, priority may be determined by the order in which the RTS lines are coupled to the various input terminals of the priority encoders 61a, 61b. Based on a particular input pattern, one and only one of the outputs of the demultiplexer 64 will be asserted. That output will remain asserted until the RTS line associated with the asserted CTS line is deasserted. Thereafter, the priority encoder will deassert the corresponding CTS line and based on the pattern of asserted/de-asserted inputs to the priority encoders, a new CTS line will be asserted.

While the particular prioritizer 60 shown in FIG. 3 is capable of performing the functions required of it, those skilled in the art will be aware that there are a variety of arrangements which are capable of performing this function on a variety of bases. In some cases, for reasons of flexibility, a programmable prioritizer 60 may be desired. In such event the allocation of priority may be altered by simple programming changes.

FIGS. 4 and 5 illustrate the protocol for initiating communication, and FIG. 6 illustrates the protocol followed by the prioritizer 60.

Referring now to FIG. 4, the steps of the protocol to open a connection from typical port A to another port B are illustrated. When the work station associated with port A desires to communicate, it manifests that desire by a message to the port. The port thereafter effects function F1 (particular the protocol chip 11) by asserting its RTS line. The protocol chip 11 awaits assertion of its CTS line (function F2). The next step is effected by generating an open command which identifies the desired remote port B, as well as the transmitting port A. This message will be gated out onto the signalling line S when the CTS line is asserted by the prioritizer 60. Receipt of CTS completes enabling the gate 15 to place the message on the S line (function F3). Once the message has been communicated, the multiprotocol chip 11 can then de-assert its RTS line (function F4). That concludes the protocol, although FIG. 4 notes that a higher level protocol (for example in the microprocessor 12) may wait for an acknowledgement from the remote port B. Typically, when a port sends the call set up message the microprocessor 12 will control the multiplexer 14 to couple the receive terminal associated with the addressed port to the switch 13. This enables the port (and the work station) to receive an acknowledgement message from the addressed port. Alternatively, the addressed port may use the addressing port's link on which to send its acknowledgement. In either case the multiplexer 14 couples the appropriate receive terminal to switch 13. At the addressed port (which is free) receipt of the signalling message on terminal SL will be acted on by the microprocessor 12 to both transmit the appropriate acknowledgement and to couple the appropriate receive terminal (corresponding to the addressing port) through the multiplexer 14 to switch 13.

FIG. 5 shows the protocol which is executed when a free port (for example port A) receives an open command from a remote port. We assume the port A is in a wait state until it detects the open message on the common signalling line S. That message will carry two parameters, its own identification A, as well as the identification x of the port desiring the communication. When that message is detected (function F5) the multi-protocol chip 11 formulates a message to the associated work station (via the switch 13 and its Tx terminal) identifying the remote port x. That terminates the protocol, insofar as the port is concerned. FIG. 5 notes that a higher level protocol (for example in the work station) may wish to acknowledge the message.

FIG. 6 illustrates the protocol or algorithm implemented at the prioritizer 60. The prioritizer is normally in a wait mode in the event that all RTS lines are de-asserted (P1). When an RTS line is asserted, the prioritizer checks to see if more than one RTS line is asserted. If so, a single line is chosen on some rational basis (P2). Having chosen a particular port x, the prioritizer grants that request (by asserting port x's CTS line) - P3. The prioritizer remains in this condition until port x de-asserts its RTS line - P5. When that occurs, port x's CTS line is de-asserted (P6) and the prioritizer returns to the P1 state where it may select another request to be granted, if any are pending.

It should be apparent that the information on the RTS and CTS lines is binary. As such, the information can be encoded by a high (or low) corresponding to assertion and a low (or high) corresponding to deassertion. Although the encoding on the RTS and CTS line may be the same, that encoding may also be different.

Having thus described our invention, what we claim as new, and desire to secure by Letters Patent is:

1. A star-topology circuit switched local area network having n work stations, each associated with a respective port for controlling the transmission and reception of data thereby, the combination comprising:

back plane means comprising n wires for transmitting data between said ports, each of said n wires dedicated to a different one of said ports, common wire means connected to each of said ports for providing a single signalling path between any of said ports and all of the other of said ports for the transfer of signals, contention resolution means connected to each of said ports for controlling the transmission of addressing signals over the common wire means between said ports, which addressing signals from an addressing port to an addressed port determine whether the addressed port is engaged, and means for connecting an addressing port and an addressed port to one of said n wires for the transmission of data signals therebetween.

2. The network of claim 1 in which said contention resolution means includes:

means at each port for asserting a request to send in response to a message initiating signal from the associated work station, a dedicated signalling link for each port for said request to send, a dedicated signalling link for each port for a clear to send, and prioritizer means coupled to all said dedicated signalling links for asserting said clear to send.

3. The network of claim 1 in which said means for connecting an addressing and addressed port include:

conductor means between each port and a different one of the dedicated wires for the transmission of data from said port, and intelligent multiplexer means at each port coupled to all said dedicated wires and responsive to signals received over said common wire means for coupling a single one of said dedicated wires to an output.

4. A communications system comprising:

a plurality of ports, each port coupled to an information source/sink for the transmission or reception of data, a plurality of communication links equal in number to the number of ports, such that each port has a dedicated link onto which it can transmit, signalling means comprising:

a signalling link coupled to all said ports for transferring call or message set up information, priority establishing means coupled to each port via a dedicated bi-directional link for allocating exclusive use of said signalling link in message or call set up, and control means, at each port, for transmitting call or message set up information over said signalling link in response to receipt of exclusive allocation of said signalling link from said priority establishing means.

5. The communication system of claim 4 in which each said port further includes second means for asserting a request, for exclusive use of said signalling link, over said bidirectional link and for de-asserting said request in response to the transmission of said call set up information.

6. The communication system of claim 4 in which each of said ports includes:

a multiplexer with a plurality of input terminals connected to different ones of said communication links and an output adapted to be connected to a receiving input of one of said information source/sinks, intelligent means for managing operations at said port and coupled to said multiplexer, to said bi-directional link and to said signalling link, and conductive means adapted to be connected to a transmitting output of one of said information source/sinks and one of said communication links and also connected to said intelligent means.

7. The communication system of claim 4 in which said priority establishing means includes:

detector means responsive to requests from said ports for determining which, if any, of said ports require said signalling link, selection means for selecting a single one of said ports requiring said signalling means, clearing means for asserting a clear to send to said one of said ports for so long as said one of said ports maintains a request to send.

* * * * *

UNITED STATES PATENT AND TRADEMARK OFFICE
CERTIFICATE OF CORRECTION

PATENT NO. : 4,740,956

DATED : April 26, 1988

INVENTOR(S) : Hailpern et al

It is certified that error appears in the above-identified patent and that said Letters Patent is hereby corrected as shown below:

Col. 7, line 48, after "means" insert -connected-.

Signed and Sealed this

Twentieth Day of December, 1988

Attest:

DONALD J. QUIGG

Attesting Officer

Commissioner of Patents and Trademarks